E. F. Dunaway
*Imp't in*
Seats for Land Conveyance
117392     Fig. 1     PATENTED JUL 25 1871
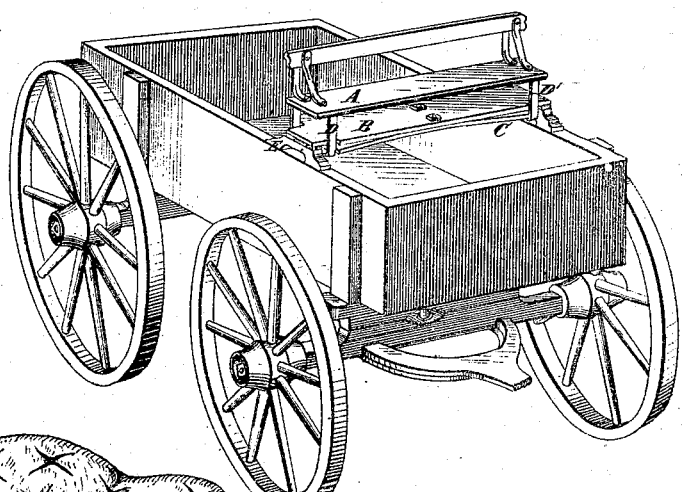
Fig. 5
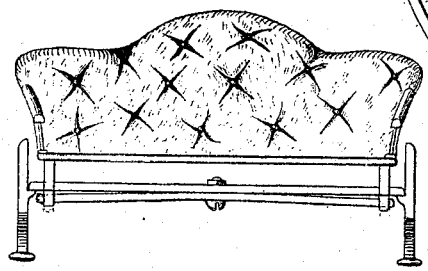
Fig. 4
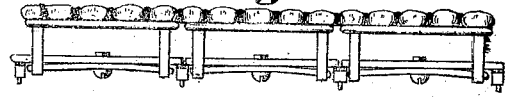
Fig. 2
Fig. 3
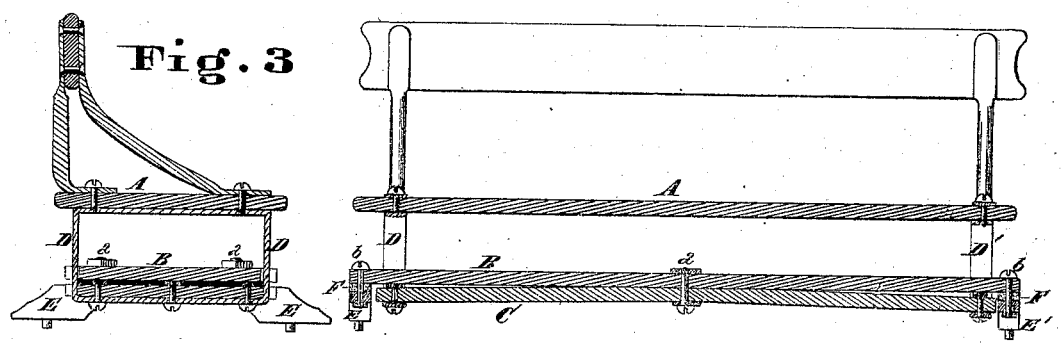
Attest
Henry Millward
Elitha F. Layman
Inventor
Elijah F. Dunaway
By F. Millward
Attorney

UNITED STATES PATENT OFFICE.

ELIJAH F. DUNAWAY, OF CINCINNATI, OHIO.

IMPROVEMENT IN SPRING-SEATS FOR WHEELED VEHICLES.

Specification forming part of Letters Patent No. 117,392, dated July 25, 1871.

*To all whom it may concern:*

Be it known that I, ELIJAH F. DUNAWAY, of Cincinnati, Hamilton county, State of Ohio, have invented a certain new and useful Spring-Seat for Wheeled Vehicles, of which the following is a specification:

My invention consists, in combination with the seat and body of the vehicle, of flat wooden springs connected to the seat, the body of the vehicle, and to each other in such a way that a very elastic seat is obtained, the springs and seat (the latter being also a spring) all acting to give a great range of elasticity without submitting any part to injurious strains.

Figure 1 is a perspective view of a road-wagon with my seat attached. Fig. 2 is a longitudinal section of the seat. Fig. 3 is a cross-section of the seat.

My improved seat, in its preferred form, is composed of three slats, as follows: Seat-slat A and springs B C. The seat-slat is connected to the spring C by frames D D' rigidly secured to them in the manner shown, the sides of the frame straddling the spring B. The springs B C are connected together, at or near the center, by bolt and nut *a*. The slat or spring B is prolonged beyond the spring C, and is connected to the feet E E' by bolts or screws *b*, rubber springs F being interposed between the slat and the feet to permit of a slight lateral movement on the part of slat B as it is depressed by the weight on the seat. The parts of the seat are connected together in such a way that the slats can all be reversed when they have become "set" by severe strain or long use.

It will be seen that, in the operation of this seat, the range of elasticity is very great, and that the strain is distributed equally among the three slats A B C. The range of elasticity is also about the same when the weight is placed on one end of slat A as when placed in the middle.

Fig. 4 illustrates a modification adapted for long seats, such as are used in omnibuses, street-cars, &c., and Fig. 5 exhibits an adaptation of my improved seat to railroad cars. Slight changes in the manner of attaching the seat to any particular kind of vehicle may be made.

I claim—

In combination with the seat composed of the parts A B C D D' and feet E E', connected substantially as described, the rubber springs F F, as and for the purpose specified.

In testimony of which invention I hereunto set my hand.

ELIJAH F. DUNAWAY.

Witnesses:
FRANK MILLWARD,
ELITHA F. LAYMAN.